June 23, 1942.  F. B. BRISTOW  2,287,019
TAILLIGHT FOR POLES OR THE LIKE
Filed Sept. 30, 1940
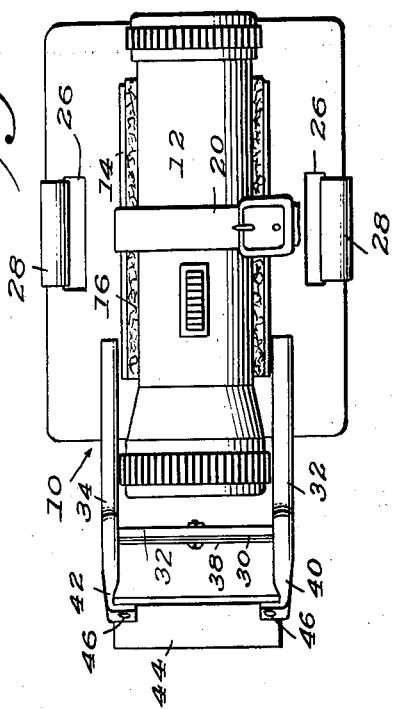
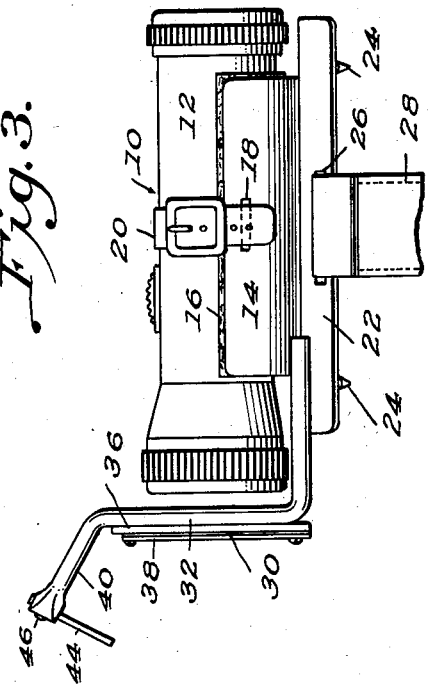
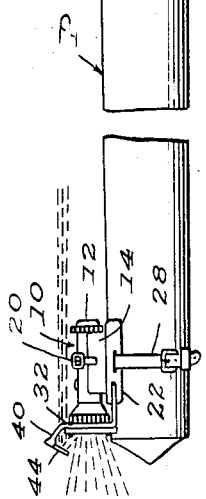
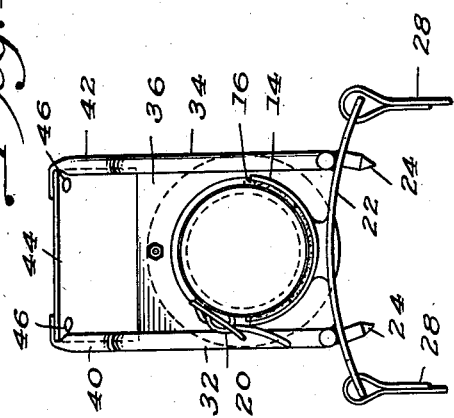
Frank B. Bristow Inventor
By Leech & Radue
Attorneys Patented June 23, 1942

2,287,019

UNITED STATES PATENT OFFICE 2,287,019

TAILLIGHT FOR POLES OR THE LIKE

Frank Benton Bristow, Mobile, Ala.

Application September 30, 1940, Serial No. 359,166

5 Claims. (Cl. 240—8.3)

This invention relates to taillights for poles or the like and is herein illustrated and embodied as a taillight for attachment to the rear end of a wooden telegraph pole which is to be transported on a two-wheel trailer truck pulled by a motor vehicle.

It is often necessary and desirable to provide a pole or the like which is being hauled on a trailer or extends from a truck with a warning or taillight of a temporary nature which will insure against collision with other vehicles traveling at night. Ordinary hand lanterns which have been used for this purpose are not wholly satisfactory because inconvenient and insecure.

The general object of the present invention is to provide a taillight for such purposes which employs an ordinary hand flashlight as its source of illumination.

According to one feature of the invention there is provided a resilient cushion or bed for supporting the flashlight against shock and jar which may destroy the filament of its lamp.

A further object is attained by the provision of a frame carrying a colored lens in a position of alignment with the lens end of the flashlight so as to give a distinctive and legal form of signal light.

In order to warn the operator of the vehicle of failure of the auxiliary taillight of this invention, a reflector is combined with the flashlight and colored lens frame and arranged to reflect forwardly where it can be readily observed.

An additional object is to provide the taillight which has been described with means for quickly and securely attaching it to a lateral surface of a pole or similar object.

These and other features of the invention including certain details of construction and combinations of parts will be described as embodied in an illustrative taillight which has proved very satisfactory.

Referring to the accompanying drawing,

Fig. 1 is a side elevation of a portion of a trailer-supported pole having the taillight of the present invention secured in place.

Fig. 2 is a plan view to a larger scale of the detached taillight.

Fig. 3 is a side elevation of the taillight as shown in Fig. 2, and

Fig. 4 is an end view from the right side of Fig. 3.

In the drawing P designates a wooden pole having a taillight 10 mounted adjacent its pointed or free end.

The taillight referred to generally by the numeral 10, includes a conventional, hand flashlight 12 of tubular form and a member 14 of trough or channel shape for supporting the flashlight 12 lengthwise. A fairly heavy sponge rubber cushion 16 is secured, as by cement, to the inside of the trough member 14 as a lining for the protection of the flashlight 12 against shock. By means of slots 18 through opposite sides of the trough member 14, a strap 20 may be passed over the body of the flashlight 12 to secure it within said trough member against the resilient cushion 16. The cushion 16 may be appropriately recessed or slotted in a manner not shown to afford easy passage for the strap 20.

Beneath the member 14, which is preferably of metal, is secured, by welding or otherwise, a reversely curved supporting plate or saddle 22 of somewhat greater size. The curvature of the plate 22 will approximate that of pole P to which it is securely attached by a plurality of downwardly projecting prongs or spurs 24, 24. Near the opposite longitudinal edges of the plate 22 are slots 26, 26 for receiving and retaining the ends of a large strap 28 which encircles the under portion of pole P as further securing means for the plate 22 of the taillight.

A colored convex lens 30 of circular shape and preferably red is positioned between a spaced pair of upwardly extending brackets 32, 34 and within a lens frame 36 welded to said brackets. The lens 30 which may be simply plane surfaced glass or other material is held in the frame 36 by a removable bezel 38.

Attention is now directed to the upwardly inclined, rearwardly extending portions 40 and 42 of the brackets 32 and 34, respectively, which portions are constructed and arranged to hold a reflector or reflecting plate 44 in a manner to be described. Any polished or plated plane surface of metal will serve admirably as the reflector element. Rivets 46, 46 or similar securing means are used to mount the reflector 44 on the outer ends of bracket portions 40 and 42 slightly above and rearwardly of the lens 30 at an angle of approximately 45 degrees with respect to the longitudinal axis of the flashlight 12, in order that it will intercept a substantial portion of the upwardly directed rays (as illustrated in Fig. 1) and reflect those rays forwardly in a generally horizontal direction. As disclosed in the various figures of the drawing, the reflector 44 which is inclined toward the lens 30 is positioned above the lower edge of that lens and to one side and rearwardly thereof so as to extend in a direction approximately perpendicular to the longitudinal axis of the trough member 14. In order to avoid rearward obstruction of the lens 30, the reflector 44 should lie outside of the projected lens area.

The operation of the taillight of this invention has been fully disclosed in the preceding part of the specification. However, it is observed by way of summary that the device can be readily prepared for use by mounting it on pole P, into which spurs 24, 24 will bite, securely lashing it on said pole with the large strap 28, and fastening the flashlight 12 within the trough member 14. The large, curved supporting plate 22 serves to align the device, and all that is then required is the energizing of the flashlight 12. The driver by use of his rear view mirror will be able conveniently to observe the operation of the taillight 10 at all times as shown by the reflector 44.

It will be apparent that the preferred embodiment of the invention which has been set forth in detail is simple and rugged and that it can be varied in a number of ways without departing from the spirit and scope of the appended claims.

Having thus described my invention, what I claim as new and desire to secure by Letters Patent of the United States is:

1. In a device of the character described, the combination comprising, a trough member adapted to support a flashlight lengthwise, a lens-supporting frame secured to said trough member and extending across one end thereof, a colored lens mounted on said frame so as to be in an aligned position with the illuminated end of a flashlight supported by said trough member, a reflector inclined toward the lens and also secured to said trough member through said frame, said reflector being positioned above the lower edge of the lens and rearwardly thereof outside of its projected area, and extending in a direction approximately perpendicular to the longitudinal axis of the trough member, whereby a portion of the rays from the flashlight passing through said lens will be intercepted and directed in an opposite direction, and means for securing a flashlight within the trough member.

2. In a taillight for attachment to a pole or the like, the combination comprising, a member adapted to support a flashlight lengthwise, a resilient lining for said member, a lens-supporting frame secured to said trough member and extending across one end thereof, a lens mounted on said frame so as to be in an aligned position with the illuminated end of a flashlight supported by said member, a reflector also secured to said member and arranged in a position above and rearwardly of the lens such that a portion of the rays from the flashlight passing through said lens will be intercepted and directed in an opposite direction, prong means projecting below the member for securing the taillight to a pole or the like, means for securing a flashlight to the member, and band means for further securing the taillight in its required position.

3. In a taillight for attachment to a pole or the like, the combination comprising, a trough member adapted to support a flashlight lengthwise, a sponge rubber cushion lining said trough member, a lens-supporting frame secured to said trough member and extending across one end thereof, a colored lens mounted on said frame so as to be in an aligned position with the illuminated end of a flashlight supported by said trough member, a reflector also secured to said trough member and arranged in a position above and rearwardly of the lens such that a portion of the rays from the flashlight passing through said lens will be intercepted and directed in an opposite direction, spur means projecting below the trough member for securing the taillight to a pole or the like, means for securing a flashlight within the trough member, and strap means connected with the trough member for further securing the taillight in its required position.

4. In a taillight for attachment to a pole or the like, the combination comprising, a trough member adapted to support a flashlight lengthwise, a saddle member shaped to fit a pole or the like integrally secured to the underside of the trough member, a sponge rubber cushion lining said trough member, a lens-supporting frame secured to said trough member and extending across one end thereof, a colored lens mounted on said frame so as to be in an aligned position with the illuminated end of a flashlight supported by said trough member, a reflector also secured to said trough member and arranged in a position above and rearwardly of the lens such that a portion of the rays from the flashlight passing through said lens will be intercepted and directed in an opposite direction, spur means projecting below the trough and saddle members for securing the taillight to a pole or the like, means for securing a flashlight within the trough member, and strap means for further securing the taillight in its required position.

5. In a taillight for attachment to a pole or the like, the combination comprising, a trough member adapted to support a flashlight lengthwise, a saddle member shaped to fit a pole or the like integrally secured to the underside of the trough member, a sponge rubber cushion lining said trough member, a lens-supporting frame secured to said trough member and extending across one end thereof, a reflector also secured to said trough member and arranged in a position above and rearwardly of the position occupied by the lens end of the flashlight such that a portion of the rays from the flashlight passing through said lens will be intercepted and directed in an opposite direction, and spur means projecting below the trough and saddle members for securing the taillight to a pole or the like.

FRANK BENTON BRISTOW.